United States Patent
Quander (10) Patent No.: US 10,654,492 B2
(45) Date of Patent: May 19, 2020

(54) METHOD AND DEVICE FOR DISPLAYING ACCELERATIONS OF PRECEDING TRANSPORTATION VEHICLES IN A TRANSPORTATION VEHICLE

(71) Applicant: VOLKSWAGEN AKTIENGESELLSCHAFT, Wolfsburg (DE)

(72) Inventor: Nils Quander, Braunschweig (DE)

(73) Assignee: Volkswagen Aktiengesellschaft (DE)

( * ) Notice: Subject to any disclaimer, the term of this patent is extended or adjusted under 35 U.S.C. 154(b) by 0 days.

(21) Appl. No.: 16/123,324

(22) Filed: Sep. 6, 2018

(65) Prior Publication Data
US 2019/0077418 A1  Mar. 14, 2019

(30) Foreign Application Priority Data
Sep. 13, 2017  (DE) .......... 10 2017 216 215

(51) Int. Cl.
*B60T 8/32* (2006.01)
*B60W 50/14* (2020.01)
*B60K 35/00* (2006.01)

(52) U.S. Cl.
CPC ............. *B60W 50/14* (2013.01); *B60K 35/00* (2013.01); *B60K 2370/152* (2019.05);
(Continued)

(58) Field of Classification Search
CPC ........... B60W 50/14; B60W 2050/146; B60W 2550/302; B60W 2550/306
See application file for complete search history.

(56) References Cited

U.S. PATENT DOCUMENTS 6,373,400 B1 *  4/2002  Fujita ............... B60K 35/00
                                                340/901
6,947,064 B1 *  9/2005  Hahn ................ G08G 1/0962
                                                345/427
(Continued)

FOREIGN PATENT DOCUMENTS

DE  102006038018 A1  2/2008
DE  102008036131 A1  3/2009
(Continued)

OTHER PUBLICATIONS

Search Report for German Patent Application No. 10 2017 216 215.5; dated May 2, 2018.

*Primary Examiner* — Munear T Akki
(74) *Attorney, Agent, or Firm* — Barnes & Thornburg LLP (57) ABSTRACT

A method for displaying in a transportation vehicle braking operations of transportation vehicles driving ahead wherein the transportation vehicles driving ahead are detected; data are collected on the acceleration of the transportation vehicles driving ahead; and, from the data on the acceleration, first transportation vehicles driving ahead with a first acceleration are determined, the first acceleration being a negative acceleration, the magnitude of which is greater than or equal to a specified threshold value. On a display area, first graphical objects are generated, each first transportation vehicle driving ahead being assigned a first graphical object which indicates that the first transportation vehicle driving ahead assigned to the first graphical object has the first acceleration. Also disclosed is a device for displaying accelerations of transportation vehicles driving ahead in a transportation vehicle.

16 Claims, 4 Drawing Sheets

(52) U.S. Cl.
CPC ............... *B60K 2370/1529* (2019.05); *B60K 2370/167* (2019.05); *B60K 2370/177* (2019.05); *B60K 2370/179* (2019.05); *B60K 2370/188* (2019.05); *B60K 2370/193* (2019.05); *B60K 2370/334* (2019.05); *B60K 2370/48* (2019.05); *B60K 2370/5915* (2019.05); *B60W 2050/146* (2013.01); *B60W 2550/302* (2013.01); *B60W 2550/306* (2013.01)

(56) References Cited

U.S. PATENT DOCUMENTS

| | | | |
|---|---|---|---|
| 2006/0015241 A1* | 1/2006 | Shima | B60K 31/0008 |
| | | | 701/96 |
| 2006/0085125 A1* | 4/2006 | Shibata | G01C 21/365 |
| | | | 701/414 |
| 2009/0112389 A1* | 4/2009 | Yamamoto | B60C 23/0401 |
| | | | 701/31.4 |
| 2013/0201335 A1* | 8/2013 | Heinemann | H04N 5/262 |
| | | | 348/148 |
| 2016/0257199 A1 | 9/2016 | Bark et al. | |

FOREIGN PATENT DOCUMENTS

| | | |
|---|---|---|
| DE | 102009021476 A1 | 11/2010 |
| DE | 102010046236 A1 | 5/2011 |
| DE | 102012002149 B3 | 6/2013 |
| DE | 102013005404 A1 | 9/2013 |
| DE | 102014002113 A1 | 8/2015 |
| DE | 102014002114 A1 | 8/2015 |
| DE | 102014008897 A1 | 12/2015 |
| DE | 102014212759 A1 | 1/2016 |
| DE | 102014218565 A1 | 3/2016 |
| DE | 102015212664 A1 | 1/2017 |
| KR | 20150113600 A | 10/2015 |
| KR | 20160037533 A | 4/2016 |

* cited by examiner

METHOD AND DEVICE FOR DISPLAYING ACCELERATIONS OF PRECEDING TRANSPORTATION VEHICLES IN A TRANSPORTATION VEHICLE

PRIORITY CLAIM

This patent application claims priority to German Patent Application No. 10 2017 216 215.5, filed 13 Sep. 2017, the disclosure of which is incorporated herein by reference in its entirety.

SUMMARY

Illustrative embodiments relate to a method for displaying accelerations of transportation vehicles driving ahead in a transportation vehicle. Illustrative embodiments also relate to a device for displaying accelerations of transportation vehicles driving ahead in a transportation vehicle.

BRIEF DESCRIPTION OF THE DRAWINGS

Disclosed embodiments are now explained with reference to the drawings, in which.

DETAILED DESCRIPTION

The trend toward higher transportation vehicles and the darkening of transportation vehicle windows makes it more difficult for drivers in small and low transportation vehicles to maintain an overview of the prevailing traffic situation, particularly in heavy traffic. The vision and the field of view of transportation vehicles travelling ahead are significantly reduced. Usually, it is only possible to see as far as the transportation vehicle driving directly in front. Therefore, in urban areas in which the traffic is very densely packed, it is becoming increasingly difficult to drive with appropriate anticipation.

A plurality of driver assistance systems is known which support drivers in avoiding collisions with other road users. These driver assistance systems actively intervene in the normal operation of the transportation vehicle and apply the transportation vehicle brakes where appropriate.

In relation to this, DE 10 2014 008 897 A1 discloses a method for calculating a predicted time for a collision between a first and a second transportation vehicle. In this method, the first transportation vehicle collects position data for the second transportation vehicle. From this and other motion data, a future trajectory for the second transportation vehicle is determined.

In addition, DE 10 2010 046 236 A1 discloses a method for controlling the longitudinal movement of a transportation vehicle. In this case, distances to transportation vehicles driving ahead are determined. A target value for the current acceleration of the transportation vehicle is determined as a function of the calculated distances. The acceleration of the transportation vehicle is then automatically set to the current target value.

A drawback of these methods, however, is that they do not support the driver in driving with anticipation.

Disclosed embodiments provide a method and a device which enable an anticipatory driving style.

In the disclosed method, the transportation vehicles driving ahead are detected. In addition, data is collected on the acceleration of the transportation vehicles driving ahead. From the data relating to the acceleration, first transportation vehicles driving ahead with a first acceleration are determined, the first acceleration being a negative acceleration, the magnitude of which is greater than or equal to a specified threshold value. Also, first graphical objects are generated on a display area, each first transportation vehicle driving ahead being assigned a first graphical object which indicates that the first transportation vehicle driving ahead assigned to the first graphical object has the first acceleration.

A first transportation vehicle driving ahead therefore has a negative acceleration. The transportation vehicle is slowing down. For a first transportation vehicle driving ahead, however, it is detected that the magnitude of the deceleration is greater than a specified threshold. Therefore, first graphical objects are not generated for all transportation vehicles that are slowing down, but only for those whose negative acceleration in terms of magnitude is greater than or equal to the threshold value. The magnitude of the negative acceleration of a first transportation vehicle is greater than or equal to the threshold value when the transportation vehicle is being actively decelerated by the activation of a transportation vehicle brake. The transportation vehicle is performing a braking operation. Such braking operations are indicated to a following transportation vehicle by the activation of brake lights on the rear of the transportation vehicle.

It is therefore determined that the first acceleration is generated by a braking operation, in which the first transportation vehicle is actively decelerated. The negative acceleration is then a braking deceleration.

In addition, a transportation vehicle can also have a negative acceleration when it is not being braked by the activation of a brake pedal. If the foot is removed from the accelerator pedal with the transportation vehicle in gear, the so-called engine braking of the transportation vehicle engages. The transportation vehicle slows down but is not actively braked. The degree of the resulting deceleration depends on the gear in which the transportation vehicle is currently driving. If the driver engages a low gear at high speed, the transportation vehicle is more strongly decelerated than if the driver merely takes his/her foot off the accelerator pedal at high speed but does not change gear. The magnitude of the generated negative acceleration can therefore also be greater than or equal to the threshold during engine braking. The first graphical objects can therefore also be assigned to transportation vehicles driving ahead which are decelerated by engine braking. A further case of engine braking also occurs during recuperation in electric transportation vehicles.

Finally, the magnitude of a negative acceleration of a first transportation vehicle driving ahead can also be greater than or equal to the specified threshold if it collides with an obstacle. The resulting negative accelerations will depend on the speed of the transportation vehicle and the speed and malleability of the obstacle. In such collisions the deceleration is usually so high that it is greater than or equal to the specified threshold value.

The specified threshold value is in a range from 0.2 m/s2 to 0.5 m/s2. Optionally, the specified threshold value is 0.3 m/s2. Such a low threshold value is beneficial particularly in stop-and-go traffic, since in that case first graphical objects are already generated when transportation vehicles driving ahead slow down from a relatively low speed of approximately 5 km/h within approximately 5 seconds to come to a halt.

In addition, a transportation vehicle is also slower when no gear is engaged and the accelerator pedal is no longer activated. In this case, the transportation vehicle is coasting to a stop. The magnitude of the negative acceleration in this case is usually not greater than or equal to the specified threshold value.

By the first graphical objects the driver of the transportation vehicle is made aware of objects moving up ahead, the negative accelerations of which cause the driver him/herself to brake their own transportation vehicle in the foreseeable future to avoid a collision with a transportation vehicle driving directly ahead.

It may be the case that the driver of the transportation vehicle cannot see transportation vehicles driving ahead of it, because they are obscured by other transportation vehicles ahead that are closer to the transportation vehicle. The driver cannot therefore immediately detect when hidden transportation vehicles ahead are actively braking. The driver can only detect this when the obscuring transportation vehicle driving in front of it brakes. Therefore, first graphical objects are displayed on the display area that indicate that the transportation vehicle assigned to the first graphical object is performing a braking operation. The driver of the transportation vehicle can thereby detect the fact that a transportation vehicle driving ahead is braking, even if he/she cannot detect this, or only with difficulty, through the windshield. This enables the driver of the transportation vehicle to prepare for this at an early stage and also to apply the brakes. The amount of time that is available to a driver to prepare themselves to brake can be extended considerably by providing an early warning of the fact that transportation vehicles ahead are braking. The probability of collisions with transportation vehicles driving ahead can thereby be reduced.

A display indicating anticipatory driving can also be used for the autonomous or semi-autonomous driving mode, to increase the acceptance of the autonomous or semi-autonomous driving on the part of the driver. The passengers in the autonomously driven transportation vehicle can then track the maneuvers of the transportation vehicle in a more relaxed way and thereby constantly increase their confidence in the system. This is because the display prepares the transportation vehicle occupants better for an impending automatic braking.

In one design, from the data on the acceleration, second transportation vehicles driving ahead with a second acceleration are determined, the second acceleration being a negative acceleration, the magnitude of which is less than the specified threshold value, a positive acceleration, or zero. Also, second graphical objects are generated on the display area, each second transportation vehicle driving ahead being assigned a second graphical object which indicates that the second transportation vehicle driving ahead assigned to the second graphical object has the second acceleration. A graphical object is then generated on the display area for each transportation vehicle driving ahead which is assigned to the object.

All detected transportation vehicles driving ahead are therefore classified. The class to which a transportation vehicle is allocated depends on the acceleration detected for the transportation vehicle. The transportation vehicles with the first acceleration are allocated to a first class and the transportation vehicles with the second acceleration to a second class. Furthermore, the transportation vehicles of the second class can be further divided into different classes. The second transportation vehicles with a negative acceleration, the magnitude of which is less than the threshold, can be allocated to a third class. The second transportation vehicles with a constant speed, in other words an acceleration equal to zero, can be allocated to a fourth class and/or the second transportation vehicles with a positive acceleration can be allocated to a fifth class. The second graphical objects are also then sub-divided once again, so that third graphical objects are generated on the display area for transportation vehicles driving ahead with a negative acceleration whose magnitude is less than the threshold, fourth graphical objects are generated for transportation vehicles with a constant acceleration and fifth graphical objects are generated for transportation vehicles with a positive acceleration. As a result, it is indicated to the driver of the transportation vehicle which transportation vehicle driving ahead is allocated to which class.

The positions relative to each other of the transportation vehicles driving ahead can also be detected, wherein the first and/or second graphical objects are arranged on the display area in such a way that the positions of the first and/or second graphical objects on the display area represent the positions relative to each other of the transportation vehicles driving ahead assigned thereto. This allows the driver to uniquely assign the position at which a braking transportation vehicle is located. In addition, the driver can be displayed the positions relative to each other of transportation vehicles driving ahead that are obscured by another transportation vehicle driving ahead. This allows the driver to better judge which of the transportation vehicles is performing a braking operation.

In addition, the distance of the transportation vehicles driving ahead from the transportation vehicle can be detected and the distances can be displayed in the corresponding graphical objects. The driver is then supported by an optical distance display.

In addition, a first characteristic of a first graphical object can depend on the magnitude of the acceleration of the first transportation vehicle assigned to the first graphical object and/or the first characteristic of a second graphical object can depend of the magnitude of the acceleration of the second transportation vehicle assigned to the second graphical object. This allows the driver, in particular, to intuitively judge the size of the braking decelerations of the first transportation vehicles. The driver can thereby better decide, at an early stage, how much he/she must slow down the transportation vehicle him/herself, to avoid a collision with a transportation vehicle driving ahead.

The first characteristic is the size of the first and/or second graphical object. The size of the first and/or second graphical object is proportional to the detected magnitude of the acceleration. The larger the detected magnitude of a transportation vehicle ahead, the larger the graphical object assigned to it is displayed on the display area. This may apply to the first graphical objects which are assigned to the first transportation vehicles. This allows the driver of the transportation vehicle to accurately judge the braking decelerations of the individual transportation vehicles.

Furthermore, the first graphical objects can differ from the second graphical objects in at least one second characteristic. The second characteristic comprises the color, the shape and/or a fill pattern of the first and/or second graphical object. In this case, the first graphical objects can be colored red and the second graphical objects colored green. Furthermore, the third, fourth and fifth graphical objects can also be distinguished from one another by the second characteristic. Thus, for example, third graphical objects can be colored orange, fourth graphical objects dark blue and fifth graphical objects green. The color, the shape and/or the fill pattern can be combined with one another.

The second characteristic changes if a change in the acceleration is detected. If, for example, a first transportation vehicle begins to accelerate positively, it will become a second transportation vehicle. The first graphical object then changes into a second graphical object.

In a different design the display area is part of a visual field display, by which the transportation vehicles driving ahead are visible. The first and/or second graphical objects are projected into the visual field of the driver of the transportation vehicle in such a way that the first and/or second graphical objects highlight the transportation vehicles driving ahead assigned thereto. For example, the graphical objects can be formed as arrows which point to the transportation vehicles driving ahead assigned thereto. As a result, the transportation vehicles driving ahead which are assigned to a braking transportation vehicle are uniquely highlighted for the driver. The arrows can be generated, in particular, as part of a display of an "augmented reality display".

Furthermore, the transportation vehicles driving ahead that are detected are located on the same lane as the transportation vehicle. In addition, it is detected that a transportation vehicle driving directly in front of the transportation vehicle blocks the view to at least some of the transportation vehicles which are detected in front of the transportation vehicle driving directly in front of the transportation vehicle, at least for the most part. The assigned first and/or second graphical objects are displayed in a spatial arrangement on the display area such that the distances of the transportation vehicles ahead relative to the transportation vehicle are clearly discernible from the spatial display. The spatial arrangement is beneficial particularly if the visual field display used for display is that in which the graphical objects are projected onto the viewing area in the same display plane. If the driving lane has a straight lane trajectory, the lateral positions with respect to the direction of travel of the transportation vehicles ahead are substantially the same. The graphical objects assigned to the transportation vehicles driving ahead would then have to be generated at substantially the same place on the display area, to highlight the transportation vehicles assigned to them. If this is the case, it is difficult for the driver to distinguish them from one another. The graphical objects are therefore arranged, for example, in such a way that the graphical object which is assigned to the transportation vehicle driving directly in front of the transportation vehicle slightly overlaps the graphical object assigned to the transportation vehicle which in turn is driving in front of this transportation vehicle. This graphical object in turn slightly overlaps the next graphical object, which is assigned to the transportation vehicle ahead. This allows the driver to judge the relative distances from the transportation vehicles ahead to his/her transportation vehicle. The driver can thereby intuitively detect which of the transportation vehicles from the group of transportation vehicles is braking.

Disclosed embodiments also relate to a device for displaying in a transportation vehicle braking operations of transportation vehicles driving ahead. The device comprises a detection device, which can be used to detect the transportation vehicles driving ahead and collect data on the acceleration of the transportation vehicles driving ahead. The device further comprises an identification device, by which first transportation vehicles driving ahead with a first acceleration can be identified from the data on the acceleration, the first acceleration being a negative acceleration, the magnitude of which is greater than or equal to a specified threshold value. The device also includes a control device and a display device, which can be controlled by the control device in such a way that first graphical objects are generated on a display area of the display device, each first transportation vehicle driving ahead being assigned a first graphical object which indicates that the first transportation vehicle driving ahead assigned to the first graphical object is performing a braking operation. The device is designed to carry out the disclosed method, and therefore has all the benefits of the disclosed method.

The detection device comprises a camera, a radar, ultrasound and/or laser sensor, and/or an interface which is designed for car-to-car communication. Additionally or alternatively, the detection device can comprise a GPS device. The GPS signals of all transportation vehicles can then be detected, and from these their positions can be detected on a continuous basis. The positional changes of the transportation vehicles can then be used to additionally detect the accelerations of the transportation vehicles.

Using a conventional optical camera, however, the detection of hidden transportation vehicles is only possible to a limited extent. For this purpose, however, camera data of other transportation vehicles can be used via car-to-car communication. Particularly beneficial, on the other hand, is the use of a radar and/or laser sensor, which enable hidden transportation vehicles to be detected. Radar sensors with an operating frequency of 77 GHz can be used. By using multiple reflections of the radar radiation, in particular at the road surface, hidden transportation vehicles can then also be detected. The data of other transportation vehicles collected by the radar, ultrasound and/or laser sensors can also be sent to the transportation vehicle via the car-to-car communication link and used to determine the acceleration of the transportation vehicles driving ahead.

The display device can in this case comprise, in particular, a visual field display. The visual field display is designed as a head-up display, which can be characterized as an "augmented reality display". In this case the display area can be either the windshield of the transportation vehicle itself or a display area arranged in the windshield. Other examples of display devices that can be used for the display include a display device arranged in the central console or in the combined instrument panel of the transportation vehicle.

Figure 1:
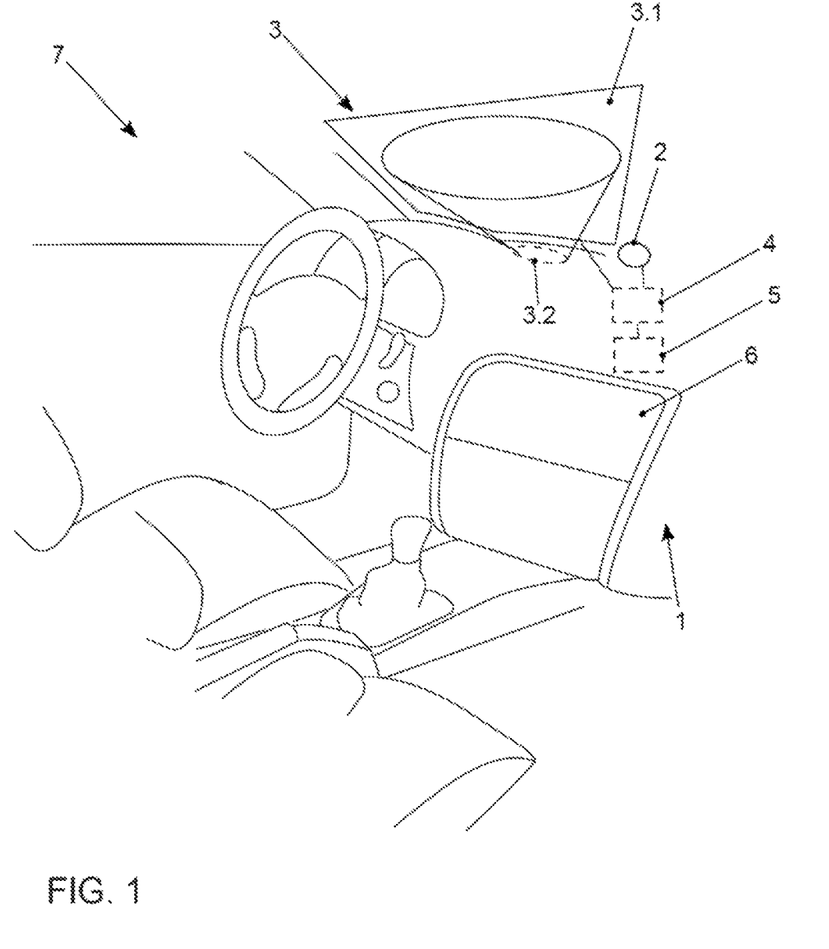
FIG. 1 shows a transportation vehicle with a disclosed device.

With reference to FIG. 1, an exemplary embodiment of a device 1, which is arranged in a transportation vehicle 7, will be explained.

The device 1 comprises a detection device 2, which is configured, for example, as a radar sensor. Alternatively or additionally, the detection device 2 can comprise a camera and/or a laser sensor. The detection device 2 allows transportation vehicles driving ahead to be detected. Furthermore, the detection device 2 can be used to collect data relating to the acceleration and the positions of the transportation vehicles ahead relative to each other and relative to the transportation vehicle 7.

Furthermore, the detection device 2 can alternatively or additionally comprise an interface by which the transportation vehicle 7 is networked with other transportation vehicles participating in the road traffic. This allows cluster data to be collected. This also allows the range from which the collected data originate to be significantly increased. The transportation vehicles driving ahead can transmit their acceleration data to the transportation vehicle 7 themselves.

The data relating to acceleration can be detected within a certain detection range which is limited, for example, by the technical characteristics of the detection device 2. Alternatively, the detection range can also be defined by the driver him/herself or at the factory. In this case, the detection radius within which transportation vehicles driving ahead are detected can be pre-configured to a value. It is also possible to configure the device such that only transportation vehicles driving ahead in the same lane are detected.

Furthermore, all transportation vehicles driving ahead can of course be detected with the associated data relating to acceleration. For graphical processing however, only the data of the transportation vehicles traveling in the same lane as the transportation vehicle 7 are then used.

The acceleration data comprise the magnitude of the acceleration and the sign of the acceleration, thus whether a transportation vehicle is positively or negatively accelerating. The magnitude of the acceleration can also be zero.

The device 1 also comprises a visual field display 3, which in turn comprises a display area 3.1 arranged in the windshield of the transportation vehicle 7, and a projector 3.2 which can project information and graphical displays onto the display surface 3.1. Alternatively, the windshield of the transportation vehicle 7 itself can be used as a display area, onto which graphical displays can be projected using the projector 3.2. The visual field display 3 can be configured as an "augmented reality display".

Furthermore, the device 1 can comprise a further display device 6 which is arranged in the central console of the transportation vehicle 7. A further display device can also be arranged in the combination instrument panel of the transportation vehicle 7.

The device 1 also comprises a control device 4, which is connected to the projector 3.2 and/or the display device 6. The control device 4 is connected to an identification device 5, which identifies from the collected acceleration data first transportation vehicles driving ahead which have a negative acceleration, the magnitude of which is greater than or equal to a specified threshold value. In addition, the identification device 5 identifies from the collected acceleration data second transportation vehicles driving ahead, which have a second acceleration. The second acceleration can also be negative, in which case the magnitude of the negative acceleration is less than the specified threshold value. Furthermore, the second acceleration can be either positive or zero. The transportation vehicles driving ahead are thus classified, wherein the first transportation vehicles are allocated to a first class and the second transportation vehicles into a second class. The control device then controls the display units 3 and/or 6 depending on the identification results, so that appropriate graphical displays are generated on the display areas of the display units 3 and/or 6.

Figure 2:
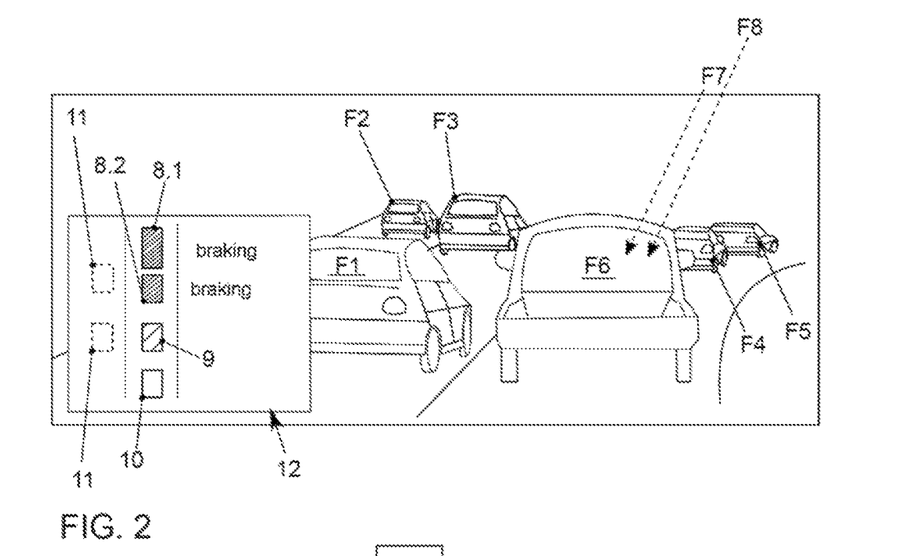
FIG. 2 shows a first exemplary embodiment of a display generated by the disclosed method.
Figure 3:
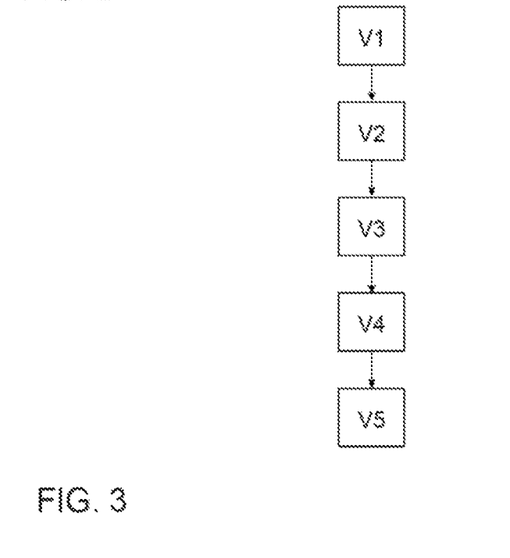
FIG. 3 shows a flow diagram of an exemplary embodiment of the disclosed method.

With reference to FIGS. 2 and 3, a first exemplary embodiment of a display 12 generated by the disclosed method and an exemplary embodiment of the disclosed method will be explained. The display 12 is projected onto the display area 3.1 arranged in the windshield of the transportation vehicle 7 into the field of view of the driver of the transportation vehicle 7 using the visual field display.

The starting point of the method is a traffic situation in which the transportation vehicle 7 is driving behind a plurality of transportation vehicles F1 to F8 driving ahead of it. This transportation vehicle F6 obscures the transportation vehicles F7 and F8, so that these can either not be seen or only poorly seen by the driver of the transportation vehicle 7. The transportation vehicles F7 and F8 are indicated by dashed arrows in FIG. 2.

In operation at V1 of the disclosed method, the transportation vehicles F1 to F8 ahead are detected by the detection device 2. The transportation vehicles F7 and F8 hidden by the transportation vehicle F6 are also detected.

In operation at V2, data relating to the accelerations of the individual transportation vehicles F1 to F8 driving ahead are also collected. For each individual transportation vehicle F1 to F8 driving ahead, it is first detected whether it is accelerating negatively, positively or not all.

If it is detected that a transportation vehicle F1 to F8 ahead has a negative acceleration, in operation at V3 of the method it is determined whether the magnitude of the negative acceleration is greater than a specified threshold value of, for example, 0.3 m/s2. If the magnitude of the detected negative acceleration is greater than the threshold value, a transportation vehicle F1 to F8 driving ahead is assigned to a first class. The first class in the present exemplary embodiment includes the transportation vehicles F7 and F8, which are being actively decelerated by the activation of a brake pedal. The transportation vehicles F7 and F8 assigned to the first class are being decelerated by active braking and therefore have a braking deceleration. A braking operation is additionally detected from whether or not the brake lights of a transportation vehicle F1 to F8 are illuminated. However, this is only detectable by the camera of the transportation vehicle 7 for the transportation vehicles F1 to F5 that are not hidden by the transportation vehicle F6.

If, on the other hand, the transportation vehicles 7 and F1 to F8 are networked with each other, then for example, camera data of the transportation vehicles F1 to F8 ahead can be accessed so that illuminated brake lights of the hidden transportation vehicles F7 and F8 can be detected. Furthermore, all other sensor data of the networked transportation vehicles F1 to F8 can also be accessed and can be used to determine whether or not a transportation vehicle F1 to F8 is performing a braking operation.

The other transportation vehicles F1 to F6 are assigned to a second class, which includes transportation vehicles whose accelerations are not generated by a braking operation. In this case, the accelerations of the transportation vehicles F1 to F6 of the second class can be negative, but the magnitude of the negative acceleration can be greater than the threshold value, or positive or zero.

In operation at V4 of the method, the positions of the transportation vehicles F1 to F8 ahead relative to each other and relative to the driver's transportation vehicle 7 are detected.

In operation at V5 a display window 12 is created on the display area 3.1. In the display window 12 two schematic driving lanes S1 and S2 are first generated, wherein the lane S1 represents the lane on which the transportation vehicle 7 is located and the lane S2 represents the adjacent lane to the left. On the schematic lane S1, first graphical objects 8.1 and 8.2, a second graphical object 9 and a further graphical object 10 are generated. The first graphical objects 8.1 and 8.2 are assigned to the braking transportation vehicles F7 and F8 and are colored red. The red coloring of the first graphical objects 8.1 and 8.2 has a warning effect, so that the driver of the transportation vehicle 7 pays particular attention to these two graphical objects 8.1 and 8.2 and can quickly and intuitively detect the fact that the transportation vehicles F7 and F8 are braking. Also, in addition to the graphical objects 8.1 and 8.2 the text string "braking" is displayed. As a result, it is made clear to the driver of the transportation vehicle 7 that the transportation vehicles F7 and F8 are braking.

Furthermore, the first graphical objects 8.1 and 8.2 differ from each other in terms of their size. The size of the graphical objects 8.1 and 8.2 depends on the size of the detected magnitude of the acceleration of the transportation vehicle F7 or F8 assigned to a graphical object 8.1 or 8.2. In this example, the magnitude of the negative acceleration of the transportation vehicle F8 is greater than the magnitude of the negative acceleration of the transportation vehicle F7. The transportation vehicle F8 is therefore braking more sharply than the transportation vehicle F7.

The second graphical object 9 is assigned to the transportation vehicle F6 traveling directly ahead of the transportation vehicle 7. The second graphical object 9 is colored dark blue. The dark blue coloring here indicates that the transportation vehicle F6 driving ahead is assigned to the second class. For example, the transportation vehicle F6 ahead is not accelerating. It is therefore moving forwards with constant speed. If the driver of the transportation vehicle F6 has already detected that the transportation vehicles F7 and F8 traveling ahead of him/her are braking and he/she then first releases the accelerator pedal, the color of the second graphical object 9 turns to orange. This indicates that the transportation vehicle F6 is indeed moving more slowly, but is not yet braking. In addition, the text string "coasting" can then appear next to the graphical object 9.

The other graphical object 10 represents the driver's own transportation vehicle 7 and is colored green. The green coloring of the graphical object 10 indicates that the driver's own transportation vehicle 7 has a positive acceleration.

The first graphical objects 8.1 and 8.2 differ from the second graphical object 9 and the other object 10 in the characteristic of color. Alternatively or in addition, different fill patterns or shapes can also be used.

In addition, the graphical objects 8.1, 8.2, 9 and 10 are arranged relative to each other as a function of the identified position of the transportation vehicles F8, F7, F6 and 7 assigned to them. The graphical objects 8.1, 8.2, 9 and 10 are arranged in a straight line one directly below another. The lowest point is occupied by the other graphical object 10, which represents the driver's own transportation vehicle 7. Arranged directly above the other graphical object 10 is the second graphical object 9, which represents the transportation vehicle F6 driving directly in front of the transportation vehicle 7. The graphical object 8.2, which represents the transportation vehicle F7 driving directly in front of the transportation vehicle F6, is in turn arranged directly above the graphical object 9. Lastly, the graphical object 8.1, which is assigned to the transportation vehicle F8 driving directly in front of the transportation vehicle F7, is arranged directly above the graphical object 8.2. Due to the relative arrangement of the graphical objects 8.1, 8.2, 9 and 10 in relation to each other, the driver of the transportation vehicle 7 can therefore immediately detect that the transportation vehicles F7 and F8 driving ahead are braking, even though they are hidden by the transportation vehicle F6. This allows the driver of the transportation vehicle 7 to better prepare for a necessary braking maneuver. The amount of time that is available to a driver to prepare themselves to brake can be extended considerably by providing an early warning of the fact that transportation vehicles F7 and F8 driving ahead are braking. The probability of a collision with the transportation vehicle F6 in front can thereby be reduced.

Furthermore, in the display window 12 graphical objects 11, which are assigned to the transportation vehicles F1 and F2, are shown on the schematic lane S2. The graphical objects 11 are shown grayed out, to indicate only that transportation vehicles F1 and F2 driving ahead are located on the lane to the left of the transportation vehicle 7.

If, for example, an intention to change lane is detected for the driver's own transportation vehicle 7, the graphical objects 11 can be colored in based on the detected acceleration for the transportation vehicles F1 and F2 assigned to them.

The transportation vehicles F4 and F5 are not assigned a graphical object in the display window 12. To ensure an uncluttered display, in the present case it is sufficient to display only the first three transportation vehicles F6-F8 driving in front of the transportation vehicle 7 in the same lane.

Additionally or alternatively, the display field 12 may be displayed on the display area of the display device 6 and/or on a display area arranged in the combination instrument panel.

Figure 4:
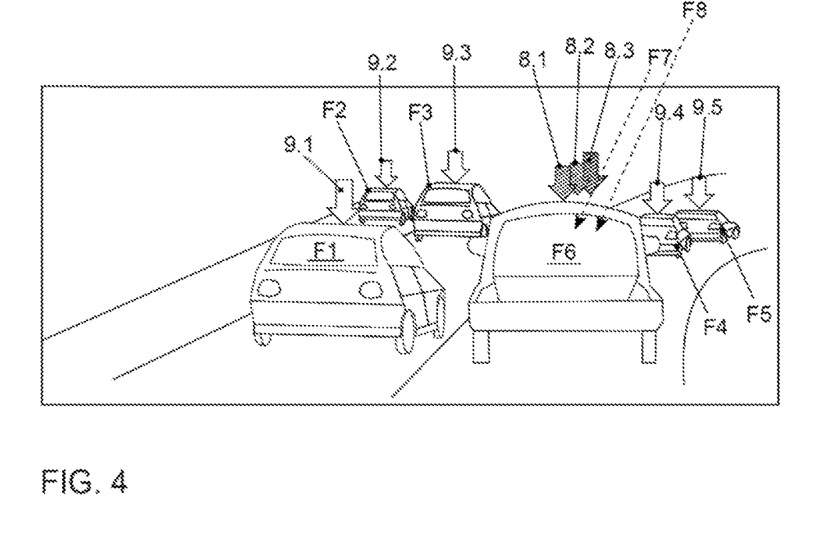
FIG. 4 shows a second exemplary embodiment of a display generated by the disclosed method.
Figure 5:
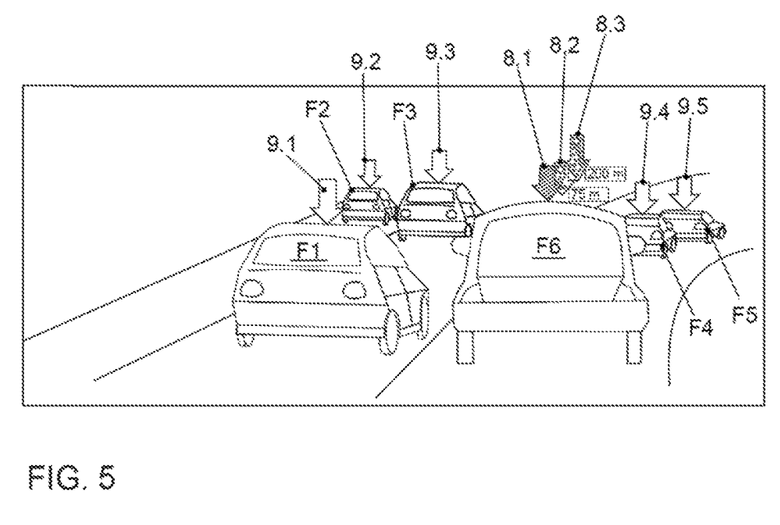
FIG. 5 shows a third exemplary embodiment of a display generated by the disclosed method.

With reference to FIG. 4, another exemplary embodiment of a display in the head-up display 3.1 is explained. The method in this case proceeds substantially analogously to the method shown in FIG. 3.

Instead of the display window 12 from FIG. 2, for each detected transportation vehicle F1 to F8 driving ahead, a graphical object 8 or 9 is generated on the display area 3.1.

For the transportation vehicles F6 to F8 it is determined in operation at V3 that they are performing braking operations.

It is also detected in operation at V4 that the transportation vehicles F4 to F8 are driving directly one in front of another in the same lane as the transportation vehicle 7.

It is also detected that the transportation vehicle F6 obscures the view of the transportation vehicles F7 and F8, at least to a large extent. This can take place, for example, via a comparison of camera data with data collected by the radar sensor 2. While the camera cannot detect the transportation vehicles F7 and F8, they are easily detected by the radar sensor 2, so that it can be inferred that the transportation vehicles F7 and F8 are obscured. On the other hand, the transportation vehicles F4 and F5, which are already located in a curved section of the same lane, are detected by both sensors.

Based on these identification results, in operation at V5 of the method graphical objects 8 and 9 are generated on the display surface 3.1, as shown in FIG. 4.

For each of the transportation vehicles F6 to F8 a first graphical object 8.1 to 8.3 is projected onto the display area 3.1 in the windshield of the transportation vehicle 7, wherein the first graphical object 8.1 is assigned to the transportation vehicle F6, the first graphical object 8.2 to the transportation vehicle F7 and the first graphical object 8.3 to the transportation vehicle F8. The graphical objects 8.1 to 8.3 are colored red, to indicate that the transportation vehicles F6 to F8 are performing a braking operation. In addition, the arrow 8.3 is significantly larger than the arrows 8.1 and 8.2. This means that the transportation vehicle F8 is braking significantly more sharply than the transportation vehicles F6 and F7.

Furthermore, the first graphical objects 8.1 to 8.3 are arranged in a spatial arrangement one in front of another. The arrow 8.1 conceals the arrow 8.2 and the arrow 8.2 conceals the arrow 8.3 to a lesser extent. This allows the driver to recognize firstly that two other transportation vehicles are located in front of the transportation vehicle F6.

In addition, from this the driver can detect the relative distances of the transportation vehicles F6 to F8 from the driver's own transportation vehicle 7. The transportation vehicle F8 is farther away from the transportation vehicle 7 than the transportation vehicle F7 and the transportation vehicle F7 is farther away from the transportation vehicle 7 than the transportation vehicle F6.

Furthermore, the driver can detect from the arrangement that the transportation vehicle F8, which is the third transportation vehicle in front of the transportation vehicle 7, is braking significantly more sharply than the transportation vehicles F6 and F7. This allows the operator to conclude that the braking deceleration of the transportation vehicles F6 and F7 is expected to become larger in the foreseeable future. The driver can immediately initiate appropriate measures to avoid a potential collision with the transportation vehicle F6.

The spatial arrangement of the arrows 8.1 to 8.3 prevents the possibility that graphical objects which are projected onto the same display plane in the display area 3.1 are mutually completely obscured when transportation vehicles are driving directly in front of one another, particularly in the case of a straight road. This is because in this case, the lateral positions of the transportation vehicles F6 to F8 are substantially the same with regard to their direction of travel in the lane, so that the graphical objects 8.1 to 8.3 would also have to be projected onto the same point of the display area 3.1. In the spatial arrangement, these then indicate the relative distances of the transportation vehicles F6 to F8 ahead to the driver's own transportation vehicle 7.

For the transportation vehicles F1 to F5, by contrast, it is determined that they are not performing a braking operation. For the transportation vehicle F1 the graphical object 9.1 is projected onto the display area 3.1, for the transportation vehicle F2 the graphical object 9.2, for the transportation vehicle F3 the graphical object 9.3, for the transportation vehicle F4 the graphical object 9.4 and for the transportation vehicle F5 the graphical object 9.5.

If for one of the transportation vehicles F6 to F8 it is detected that it is accelerating positively again or is no longer braking, the color of the associated first graphical object 8.1 to 8.3 changes to green. In addition, the positions of the first graphical objects 8.1 to 8.3 are continuously adjusted to match the positions of the transportation vehicles F6 to F8 assigned to them.

With reference to FIG. 4, a fourth exemplary embodiment of a generated display will be described.

The display shown in FIG. 4 substantially corresponds to the display shown in FIG. 3.

In this case, for the transportation vehicles F7 and F8 it is detected that the magnitude of the negative acceleration is less than the threshold value. The transportation vehicles are thus slowing down, but not being actively braked. The transportation vehicles F7 and F8 are coasting. In this case, the transportation vehicles F7 and F8 are assigned to a third class, which is, for example, a subclass of the second class. The graphical objects 8.2 and 8.3 then again have a different color, a different fill pattern and/or a different shape than the graphical object 8.1, which still represents the transportation vehicle F6 which is performing a braking operation.

In addition, the distances of the transportation vehicles F7 and F8 driving ahead from the transportation vehicle 7 are detected and displayed in the graphical objects 8.2 and 8.3. In addition, in the graphical objects 8.2 and 8.3 the text string "coasting" can be displayed, while in the graphical object 8.1 the text string "braking" can be displayed. Furthermore, in the graphical object 8.1 the distance to the transportation vehicle 7 can also be displayed.

The first, second and third exemplary embodiments can be combined with each other, so that even in the first exemplary embodiment graphical objects can be generated for all detected transportation vehicles driving ahead.

The colors of the graphical objects of the second exemplary embodiment can be further subdivided by detecting whether the transportation vehicles assigned to the graphical objects are performing a braking operation, coasting, or have either a positive or no acceleration.

LIST OF REFERENCE NUMERALS 1 device
2 detection device
3 head-up display
3.1 display area; windshield
3.2 projector
4 control device
5 identification device
6 display device
7 transportation vehicle
8, 8.1-8.3 first graphical objects
9, 9.1-9.5 second graphical objects
10 additional graphical object
11 graphical object
12 display window
F1-F8 transportation vehicles driving ahead
V1-V5 method operations

The invention claimed is:

1. A device for displaying accelerations of transportation vehicles driving ahead of a transportation vehicle, the device being installed in the transportation vehicle, the device comprising:
a detection device by which the transportation vehicles driving ahead and data on the acceleration of the transportation vehicles driving ahead is detected;
an identification device by which, from the data on the acceleration, first transportation vehicles driving ahead with a first acceleration are identified, the first acceleration being a negative acceleration, a magnitude of which being greater than or equal to a specified threshold value, wherein it is determined that the first acceleration is generated by a braking operation in which the first transportation vehicle is actively decelerated;
a control device; and
a display device controlled by the control device so first graphical objects are generated on a display area of the display device, wherein each first transportation vehicle driving ahead is assigned a first graphical object of the first graphical objects which indicates that the first transportation vehicle driving ahead assigned to the first graphical object has the first acceleration.

2. A method for displaying accelerations of transportation vehicles driving ahead of a transportation vehicle, the accelerations being displayed in the transportation vehicle, the method comprising:
detecting the transportation vehicles driving ahead;
acquiring data on the acceleration of the transportation vehicles driving ahead;
determining, from the data on the acceleration, first transportation vehicles driving ahead with a first acceleration, the first acceleration being a negative acceleration, a magnitude of which is greater than or equal to a specified threshold value;

determining that the first acceleration is generated by a braking operation in which the first transportation vehicle is actively decelerated; and generating first graphical objects on a display area, each first transportation vehicle driving ahead being assigned a first graphical object which indicates that the first transportation vehicle driving ahead assigned to the first graphical object has the first acceleration.

3. The method of claim 2, further comprising:

determining, from the data on the acceleration, second transportation vehicles driving ahead with a second acceleration, the second acceleration being a negative acceleration, the magnitude of which is less than the specified threshold value, a positive acceleration or zero, and generating second graphical objects on the display area, each second transportation vehicle driving ahead being assigned a second graphical object, which indicates that the second transportation vehicle driving ahead assigned to the second graphical object has the second acceleration.

4. The method of claim 2, further comprising detecting the positions relative to each other of the transportation vehicles driving ahead, wherein the first and/or second graphical objects are arranged on the display area so positions of the first and/or second graphical objects on the display area represent the positions relative to each other of the transportation vehicles driving ahead assigned thereto.

5. The method of claim 2, wherein a first characteristic of the first graphical object depends on the magnitude of the acceleration of the first transportation vehicle assigned to the first graphical object and/or the first characteristic of a second graphical object depends of the magnitude of the acceleration of the second transportation vehicle assigned to the second graphical object.

6. The method of claim 5, wherein the first graphical objects differ from the second graphical objects in a second characteristic.

7. The method of claim 6, wherein the first characteristic is the size of the first and/or second graphical object and the second characteristic comprises the color, the shape and/or a fill pattern of the first and/or second graphical object.

8. The method of claim 2, wherein:

the display area is part of a visual field display by which the transportation vehicles driving ahead are visible, and the first and/or second graphical objects are projected in the display area into the visual field of the driver of the transportation vehicle so the first and/or second graphical objects highlight the transportation vehicles driving ahead assigned thereto.

9. The method of claim 8, wherein:

the transportation vehicles driving ahead that are detected are located on a same lane as the transportation vehicle, wherein, it is detected that a transportation vehicle driving directly in front of the transportation vehicle blocks the view onto at least some of the transportation vehicles which are detected in front of the transportation vehicle driving directly in front of the transportation vehicle, at least for the most part, and wherein the first and/or second graphical objects are displayed in a spatial arrangement on the display area so the distances of the transportation vehicles ahead relative to the transportation vehicle are discernible from the spatial display.

10. The device of claim 1, wherein, from the data on the acceleration, determination of the second transportation vehicles driving ahead is performed with a second acceleration, the second acceleration being a negative acceleration, the magnitude of which is less than the specified threshold value, a positive acceleration or zero, and wherein second graphical objects are generated on the display area, each second transportation vehicle driving ahead being assigned a second graphical object, which indicates that the second transportation vehicle driving ahead assigned to the second graphical object has the second acceleration.

11. The device of claim 1, wherein the positions relative to each other of the transportation vehicles driving ahead are detected, wherein the first and/or second graphical objects are arranged on the display area so positions of the first and/or second graphical objects on the display area represent the positions relative to each other of the transportation vehicles driving ahead assigned thereto.

12. The device of claim 1, wherein a first characteristic of the first graphical object depends on the magnitude of the acceleration of the first transportation vehicle assigned to the first graphical object and/or the first characteristic of a second graphical object depends of the magnitude of the acceleration of the second transportation vehicle assigned to the second graphical object.

13. The device of claim 12, wherein the first graphical objects differ from the second graphical objects in a second characteristic.

14. The device of claim 13, wherein the first characteristic is the size of the first and/or second graphical object and the second characteristic comprises the color, the shape and/or a fill pattern of the first and/or second graphical object.

15. The device of claim 1, wherein:

the display area is part of a visual field display by which the transportation vehicles driving ahead are visible, and the first and/or second graphical objects are projected in the display area into the visual field of the driver of the transportation vehicle so the first and/or second graphical objects highlight the transportation vehicles driving ahead assigned thereto.

16. The device of claim 15, wherein:

the transportation vehicles driving ahead that are detected are located on a same lane as the transportation vehicle, wherein, it is detected that a transportation vehicle driving directly in front of the transportation vehicle blocks the view onto at least some of the transportation vehicles which are detected in front of the transportation vehicle driving directly in front of the transportation vehicle, at least for the most part, and wherein the first and/or second graphical objects are displayed in a spatial arrangement on the display area so the distances of the transportation vehicles ahead relative to the transportation vehicle are discernible from the spatial display.

\* \* \* \* \*